United States Patent
Tornquist et al.

(10) Patent No.: US 7,146,707 B2
(45) Date of Patent: Dec. 12, 2006

(54) METHOD OF ASSEMBLING A BALANCED HIGH SPEED GENERATOR ROTOR

(75) Inventors: Gerald Eugene Tornquist, Tucson, AZ (US); Raymond Walter Borden, Farmingdale, NJ (US); James D. Lengel, Oro Valley, AZ (US); Gregor L. McDowall, Tucson, AZ (US); Kieran P. J. Doherty, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 432 days.

(21) Appl. No.: 10/785,491

(22) Filed: Feb. 23, 2004

(65) Prior Publication Data

US 2004/0164627 A1    Aug. 26, 2004

Related U.S. Application Data

(62) Division of application No. 09/991,501, filed on Nov. 16, 2001, now Pat. No. 6,734,585.

(51) Int. Cl.
  *H02K 15/02* (2006.01)
  *H02K 15/10* (2006.01)
(52) U.S. Cl. .................. 29/598; 29/597; 29/402.09; 29/428; 29/890.035; 310/52; 310/58; 310/59; 310/61; 417/366; 417/410.3

(58) Field of Classification Search .............. 29/598, 29/597, 402.9, 428, 890.035; 310/52, 58, 310/59, 61; 417/366, 410.3
See application file for complete search history.

(56) References Cited

U.S. PATENT DOCUMENTS 5,587,616 A * 12/1996 Johnsen .................... 310/68 D
6,465,928 B1 * 10/2002 Shervington et al. ....... 310/270

* cited by examiner

*Primary Examiner*—A. Dexter Tugbang
*Assistant Examiner*—Tim Phan
(74) *Attorney, Agent, or Firm*—Ingrassia Fisher & Lorenz

(57) ABSTRACT

An improved apparatus and method of having a pair of end caps on a rotor assembly of a multi-pole high-speed generator is provided for use with a turbine engine. The rotor assembly provides improved balancing and/or cooling during generator operation. The rotor assembly includes a plurality of poles and at least one support wedge positioned between each of the poles. The rotor assembly is mounted on a shaft. An annular flange of the end caps restrains the support wedges in the rotor assembly for improved balancing and maintaining concentricity. The end caps may also include a manifold for circulating a cooling medium through the shaft to and from the support wedges to cool the generator.

1 Claim, 6 Drawing Sheets

METHOD OF ASSEMBLING A BALANCED HIGH SPEED GENERATOR ROTOR

This application is a divisional of Ser. No. 09/991,501 filed on Nov. 16, 2001 now U.S. Pat. No. 6,734,585.

FIELD OF THE INVENTION

This invention relates generally to a multi-pole high-speed generator, and, more particularly, to an apparatus and method of having a pair of end caps on a rotor of the multi-pole high-speed generator for balancing the rotor and controlling concentricity and cooling during generator operation.

BACKGROUND OF THE INVENTION

High-speed generators are used in many applications, including on gas turbine engines for aircraft, ships, and military vehicles. Such generators typically rotate at relatively high speeds (e.g., 12,000 r.p.m. to 24,000 r.p.m. or greater) during operation. While high-speed generators are generally safe and reliable, they may have drawbacks in certain circumstances. Large centrifugal forces may be imposed upon the generator's rotating parts, such as the rotor. One such generator rotor has four poles, each of which is wound with wire conductors, called windings. During operation of the generator, the windings that rotate with the rotor are subjected to these relatively high centrifugal forces, which may cause the windings to separate from the rotor. The centrifugal forces may also cause the rotor to become improperly balanced and thus off-center as it spins during generator operation. Improper balancing of a rotor in particular can result in inefficiency in the operation of the generator, and may in extreme circumstances cause generator failure.

To secure the windings against such centrifugal forces, it is known to mount support wedges between each of the respective poles. Although these support wedges assist in containing the windings against the pole body so as to oppose the centrifugal force during rotation of the rotor, they too experience high centrifugal forces. The centrifugal forces may cause the support wedges to slip radially outward away from the shaft of the rotor, thus limiting the ability of the support wedges to secure the windings against the pole body. Particularly if the axial length of a conventional rotor is relatively large in comparison with its diameter, the centrifugal forces may cause significant radial deflection or flexure of the support wedges near the rotor's axial midpoint.

In order to prevent the support wedges from slipping radially outward, a conventional rotor may use bands around the outer diameter of the rotor to retain the support wedges. In another conventional rotor, an "underwedge" system may be employed in which the support wedges extend in their arc length all of the way between neighboring pole tips on the rotor and snap rings are then used to hold the support wedges in place relative to the poles.

These conventional structures for retaining support wedges in place on the rotor are limited in their effectiveness in high-speed generator applications. Both the bands used to retain the support wedges and the components of the underwedge systems (particularly the snap rings) also can suffer from bending from centrifugal forces and therefore may provide only a limited amount of counteracting force to keep the support wedges in place and may create an additional imbalance in the rotor. Additionally, because it is difficult to accurately control the positioning of, and the amount of pressure applied by the bands and underwedge componentry, it may be difficult to accurately set and maintain the positioning of the support wedges and to control the concentricity of the various support wedges around the rotors during operation of the generator. If the support wedges are not concentric (or evenly-spaced) about the rotor's axis, then the spinning rotor assembly will be out of balance.

Also during operation of the generator, current passes through the wire windings, thereby generating heat. Some of this heat should be removed from the generator, particularly from the windings, to allow efficient operation of the generator and to keep the wire winding temperature below the point where the wire's insulation begins to break down. If an insufficient amount of heat is removed from the generator, then the power output from the generator may be limited and the insulation of the wires within the generator may degrade. Conventional cooling systems such as air or limited conduction, or spray of the rotor core may, under certain circumstances, not offer sufficient heat dissipating capacity for the high speed generators.

Accordingly, there is a need for a novel rotor assembly and method that will permit a high-speed generator to work at optimum efficiency. There is also a need for a novel rotor assembly and method that will provide improved securing of support wedges on a rotor even at high speeds of operation so that the support wedges will continue to provide support for and direct pressure toward the generator windings. There also is an additional need for a novel rotor assembly and method that will accurately set and maintain the positioning of the support wedges and control the concentricity of the various support wedges mounted around the rotor during operation of the generator. There is an additional need for a novel rotor assembly and method that do not have components that have a tendency to increase rotor imbalance. There is a further need for a novel rotor assembly and method that substantially cool the generator during operation thereof. The present invention fulfills one or more of these needs and may provide other related advantages.

SUMMARY OF THE INVENTION

The present invention provides a multi-pole high-speed generator comprising, generally, a rotor assembly with a rotor having an end cap on each end for balancing the rotor and controlling concentricity and cooling thereof during generator operation. The method of cooling the generator using the end caps is also provided.

The rotor includes a plurality of poles that extend radially away from the shaft, each of which is wound with conductors, called windings. The rotor is defined by a generally cylindrical rotor body with a shaft extending axially through the rotor. The shaft includes a bore extending from a first end having an opening to a second closed end. Additionally, orifices extending radially from the bore are provided in a side wall of the shaft near the first and second ends thereof. The number of orifices at each end of the shaft corresponds to the number of poles.

A support wedge is mounted in the area between each of the respective poles. The support wedge may include an outer support wedge and an inner support wedge. The position of the outer support wedge is accurately set and restrained on the rotor by the end caps. A first and a second end of each of the outer support wedges include paired openings arranged either along an outer edge of the outer support wedge in the first embodiment or along the same radial line in an alternative embodiment. The first and second ends of the outer support wedges in the first embodiment may also include at least one supply port which is open to at least one axial channel in the outer support wedges for flow of a cooling medium, preferably oil.

The end caps comprise a substantially circular end wall circumferentially surrounded by an annular flange. The annular flange projects inwardly from the end wall toward the opposite end cap. The end caps include paired end cap openings with each pair at 90 degree angles to each other. In the first embodiment, the paired end cap openings are arranged circumferentially with a separate cooling medium feed port between the openings in each pair. In an alternative embodiment, the paired end cap openings may be arranged along the same radial line with at least one of the openings in each pair serving as the cooling medium feed port. The at least one of the openings in each pair may be slightly larger to effect this purpose. Each of the end caps also include a bore substantially in the center of the end wall and a raised peripheral edge having a plurality of circumferentially spaced openings provided therein for insertion of weights to help balance the rotor.

The end caps also include a manifold for circulating the cooling medium through the rotor. The manifold is at a hub location on the interior of each end cap. The manifold includes an annulus at an inner face of the bore and cooling medium galleries that extend radially away from the annulus toward an inner surface of the flange. The cooling medium galleries are each capped by a plug at an outer surface of the flange. The number of cooling medium galleries in each end cap corresponds to the number of support wedges. The end caps and/or the outer support wedges may include a groove for a sealing member between the end caps and the outer support wedges.

To assemble the rotor, the end caps are positioned on the respective ends of the rotor body with the bore centered around the shaft to substantially maintain rotor centerline control during generator operation. The annular flange extends circumferentially around the axial ends of the rotor body including the axial ends of the outer support wedges to help restrain them against the windings. After being machined to provide close tolerance fits, the ends of the outer support wedges are substantially centered under the inside of each flange. In the first embodiment, the separate cooling medium feed port in the end caps are mated with the at least one supply port in the first and second ends of the outer support wedges. The paired end cap openings are mated with the paired openings in the first and second ends of the outer support wedges. Axial screws are inserted into the paired end cap openings and then into the corresponding paired openings in the ends of the outer support wedges. In the alternative embodiment, this means that at least one of the end cap openings in each pair serves as both the cooling medium feed port and receives the axial screws and at least one of the paired openings in the first and second ends of the other support wedges serves as the supply port and receives the axial screws.

The bore and the annular flange are shrunk fit respectively around the shaft and over the axial ends of the outer support wedges. Thus, the end caps are shrunk fit both between the shaft at an end cap inner diameter and the outer support wedges at an end cap outer diameter. The end caps seal the rotor ends and restrain the support wedges tightly against the windings. When the end caps are disposed over a first and second end of the rotor body, each of the cooling medium galleries in the end caps radially extend from one of the orifices in the shaft to the at least one supply port in each end of the outer support wedges. The first end of the rotor body is the anti-drive end, and the second end of the rotor body is the drive end.

During operation of the generator, the cooling medium flows into the first end of the shaft, exits the shaft radially out the orifices at a second end of the shaft, through the annulus to the cooling medium galleries in the end cap at the second end of the rotor body, into at least one feed port into that end cap and into the at least one supply port in the second end of each of the outer support wedges, through the axial channels of the outer support wedges extracting heat, then out the at least one supply port at the first end of each of the outer support wedges, through the radial cooling medium galleries of the end cap at the first end of the rotor body, out the annulus of that end cap and into the orifices at the first end of the shaft for exiting out the open first end of the shaft and removing heat from the rotor.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the preferred embodiment of the invention. In such drawings.

DETAILED DESCRIPTION OF THE PREFERRED EMBODIMENT

Figure 1:
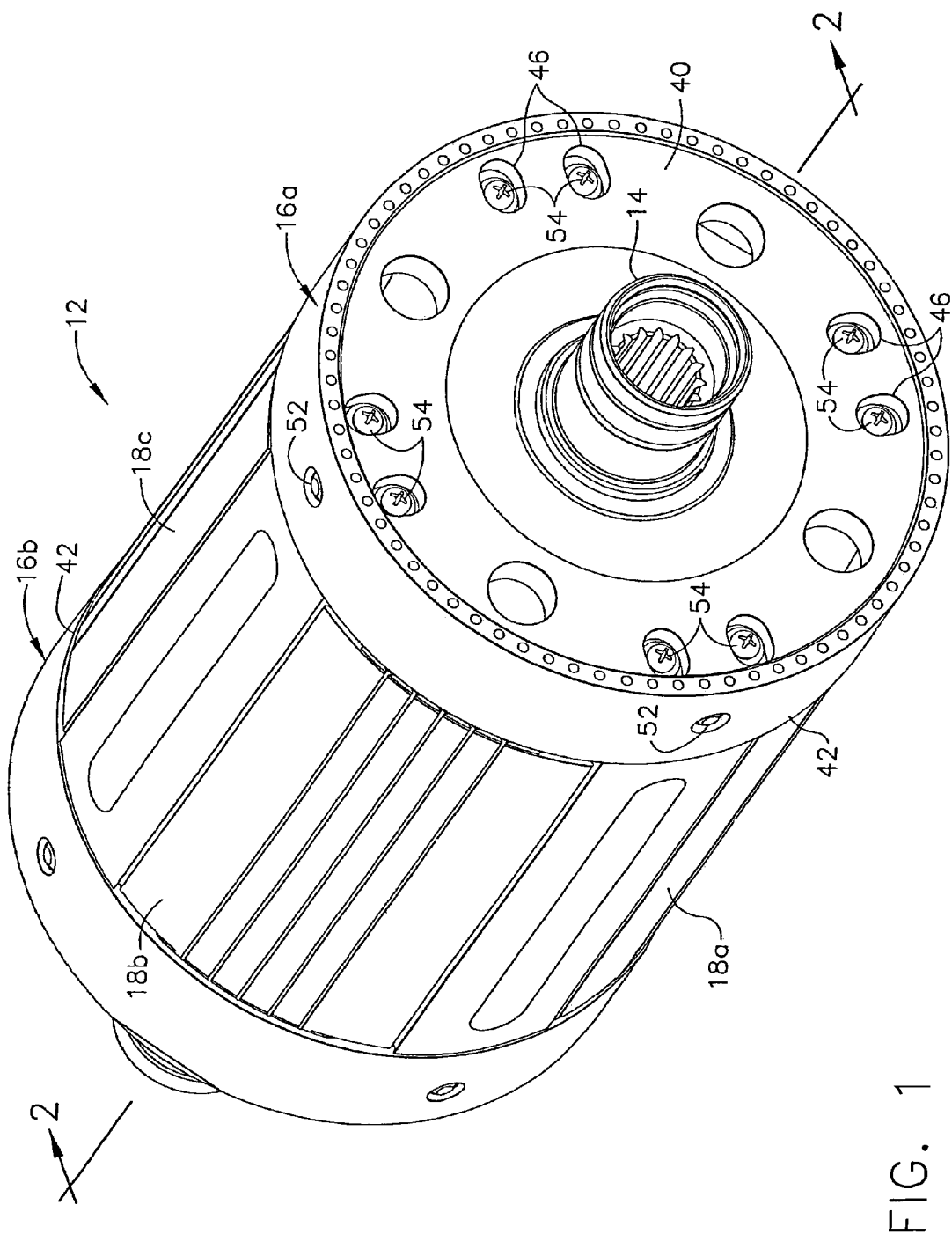
FIG. 1 is a perspective view of a rotor assembly mounted on a shaft according to the present invention.

As shown in the drawings for purposes of illustration, the present invention is concerned with an improved high-speed generator for use with a turbine engine, generally designated in the accompanying drawings (FIG. 7) by the reference number 10. The improved high-speed generator 10 comprises, generally, a rotor assembly 12 mounted on a shaft 14, and end caps 16a and 16b for the rotor assembly 12. In accordance with the present invention, and as illustrated with respect to a preferred embodiment in FIGS. 1–7, the improved high-speed generator 10 enables rotor rotation at high speeds, with the end caps 16a and 16b providing improved cooling, structural support and concentricity control to the rotor assembly 12. A method of cooling the generator using the end caps is also provided.

Figure 2:
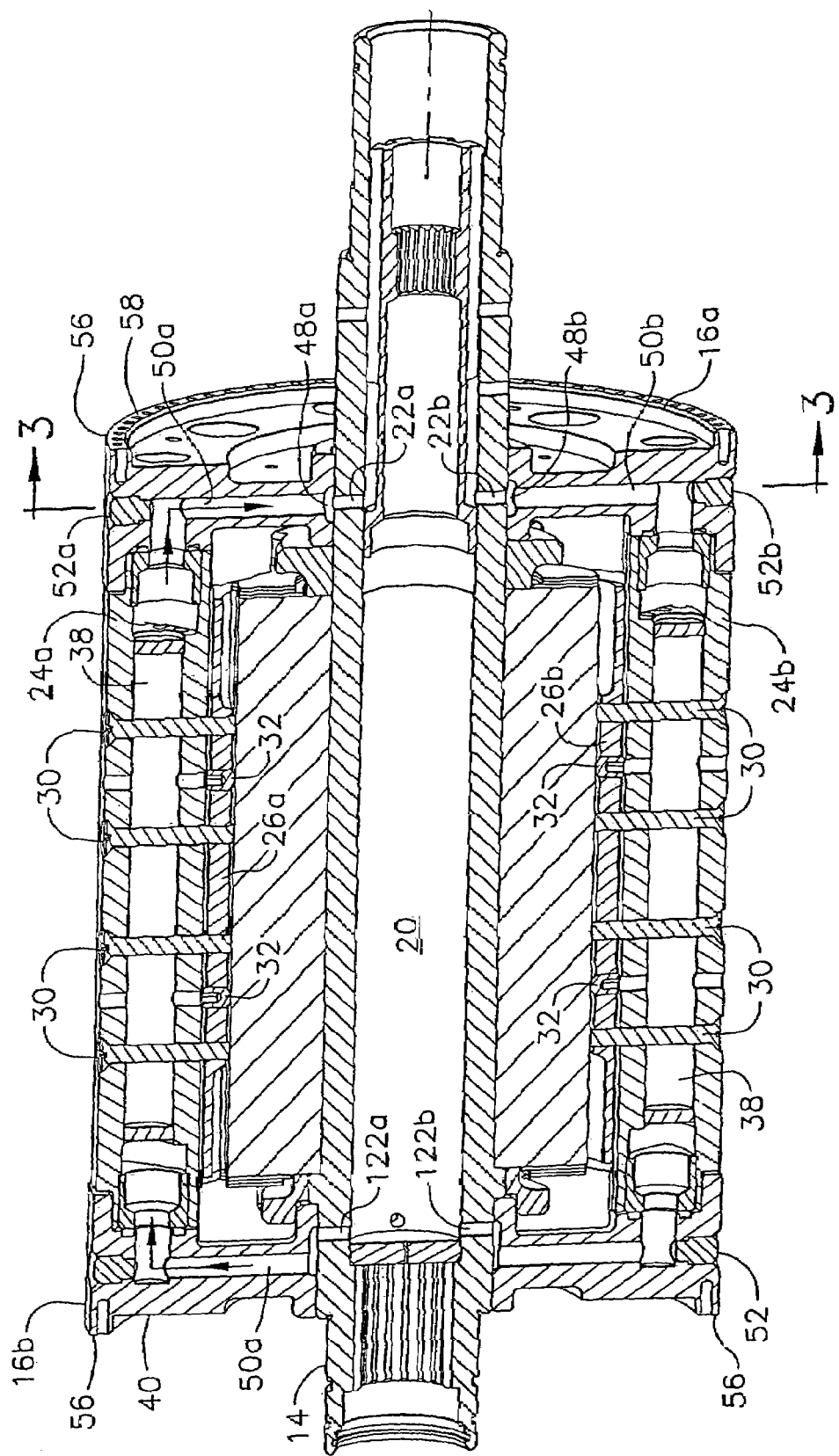
FIG. 2 is a cross-sectional view of the rotor assembly of FIG. 1 taken along the lines 2—2 of FIG. 1.
Figure 3:
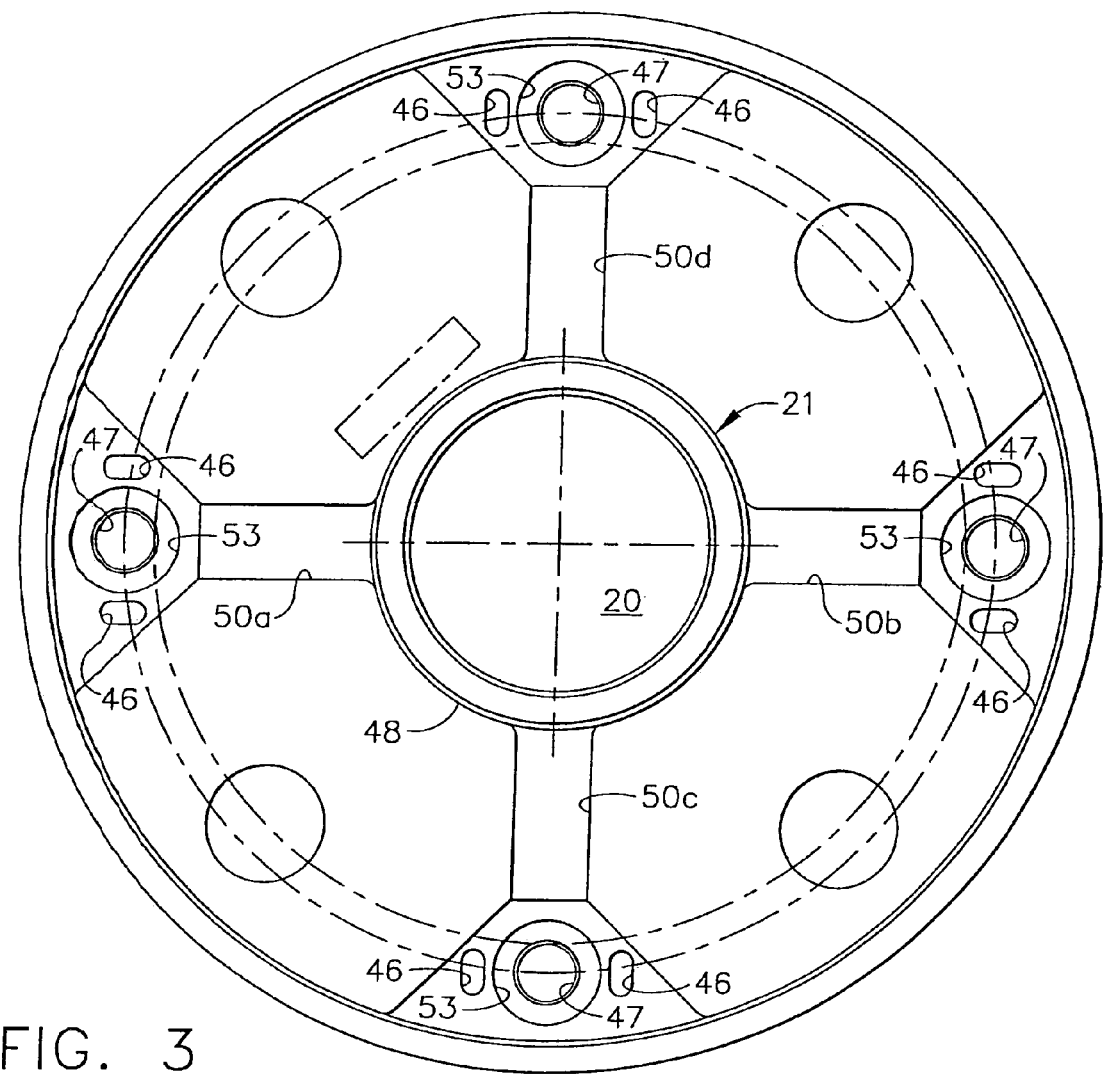
FIG. 3 is a end view of one of the end caps looking at the generator core side of the end cap.
Figure 4:
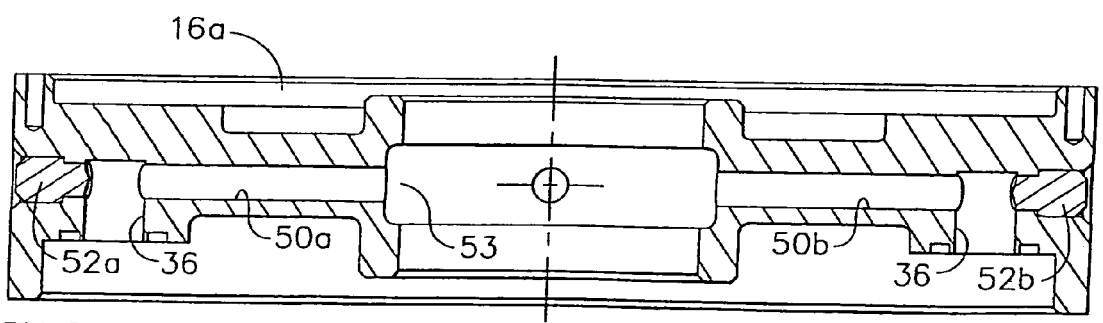
FIG. 4 is a cross-sectional view of the end cap on a first end of a rotor body taken along the lines 3—3 of FIG. 2.

FIG. 1 illustrates a completely-assembled rotor assembly 12 having an exemplary four poles 18a–18d (pole 18d being hidden from view) that extend radially away from the shaft 14, each of which is wound with conductors, called windings (not shown). The rotor assembly 12 is defined by a generally cylindrical rotor body with the shaft 14 extending axially through the rotor body as shown in FIG. 2. The shaft 14 includes a bore 20 extending from a first end having an opening to a second closed end. Additionally, orifices 22a–22d and 122a–122d (22c–22d and 122c–122d not visible) extending radially from the bore 20 are provided in a side wall of the shaft 14, respectively, near the first and second ends thereof. The shaft 14 shown in FIG. 2 has four orifices 22a–22d and 122a–122d (22c–22d and 122c–122d not visible) at each of the first and second ends respectively of the shaft 14. The number of orifices at each end of the shaft 14 corresponds to the number of poles.

Figure 5:
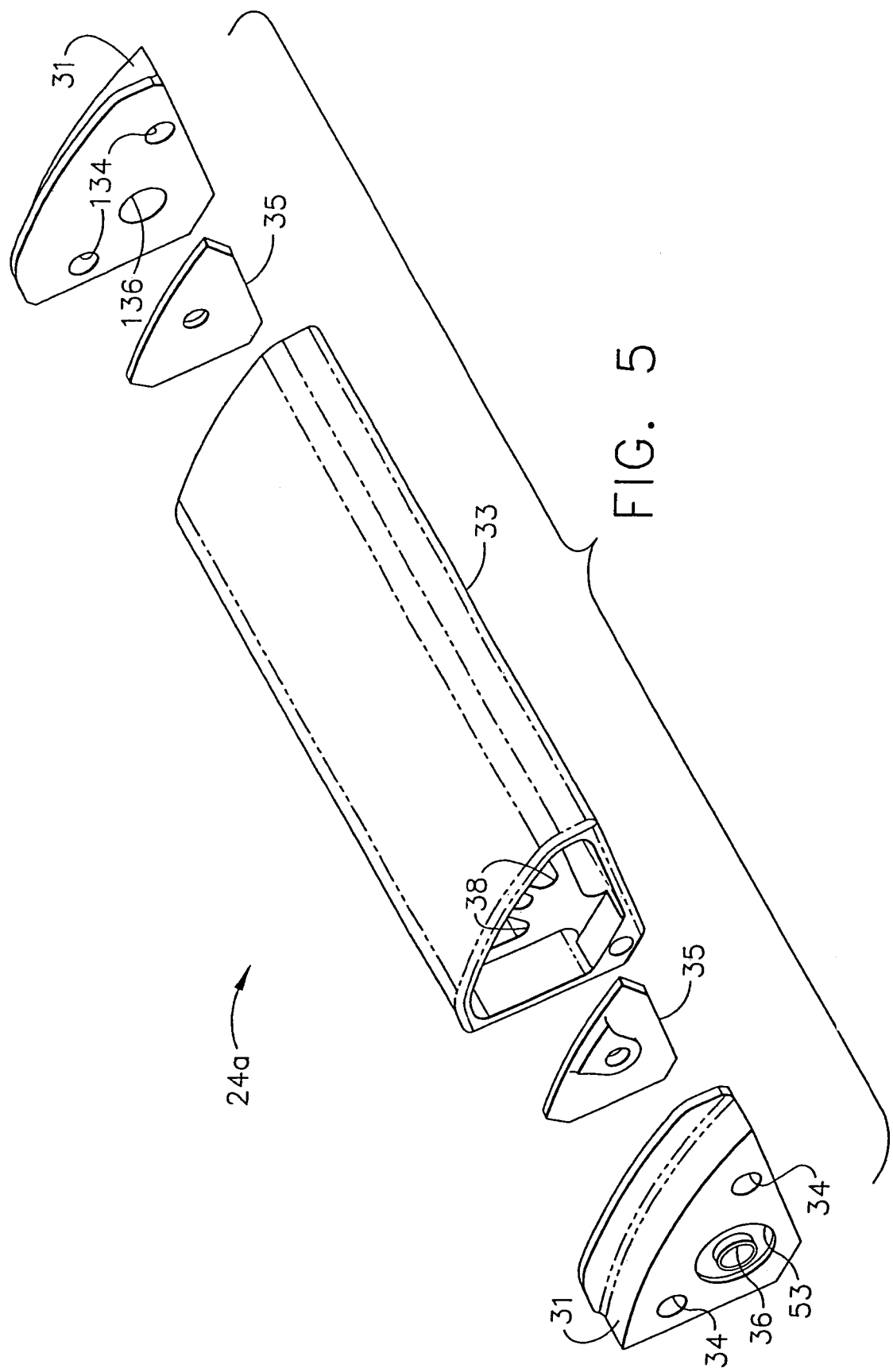
FIG. 5 is an exploded view of one embodiment of an outer support wedge assembly; such as that retained by the end cap of FIG. 3
Figure 6:
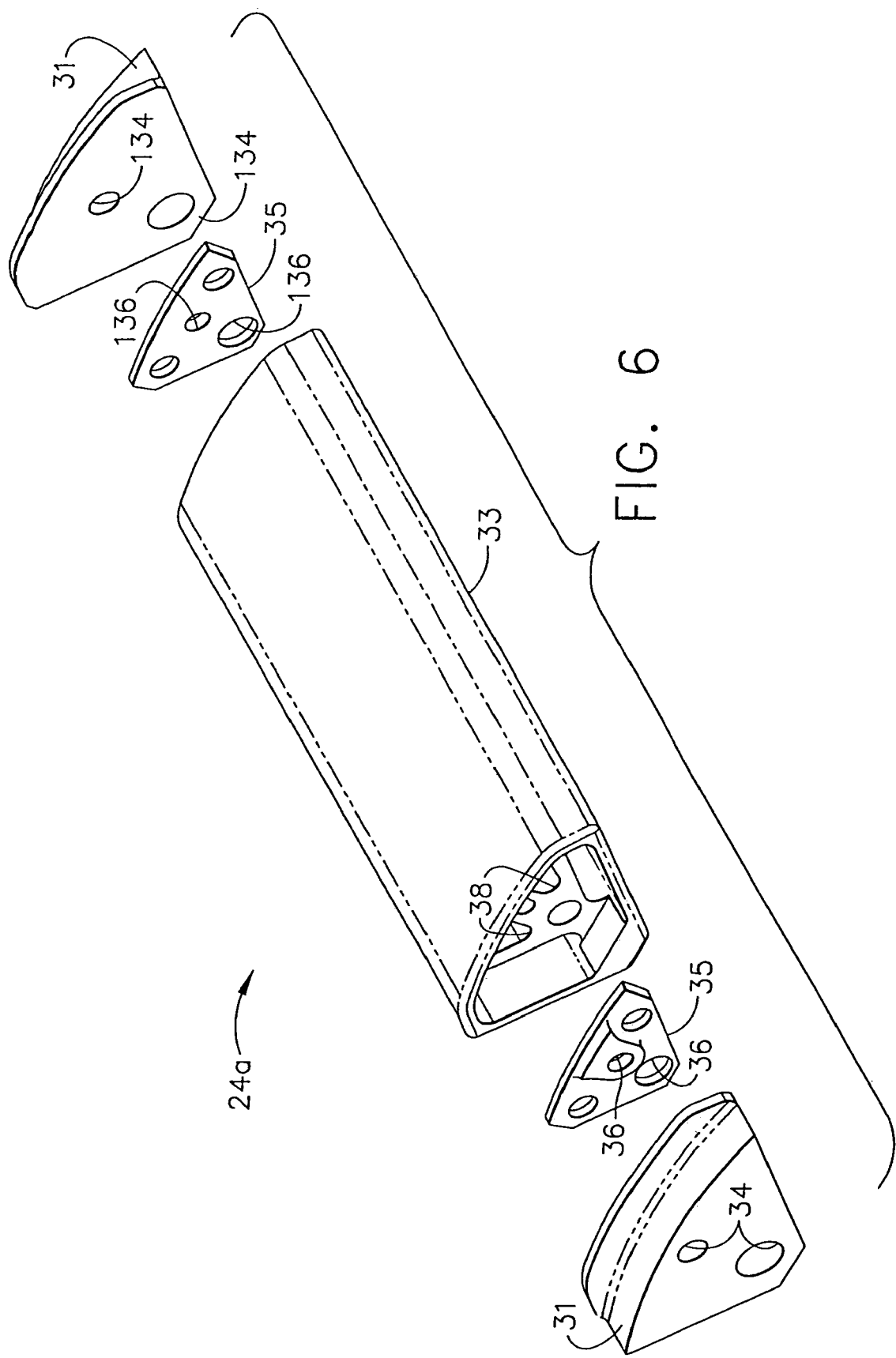
FIG. 6 is an exploded view of an alternative embodiment of an outer support wedge assembly.
Figure 7:
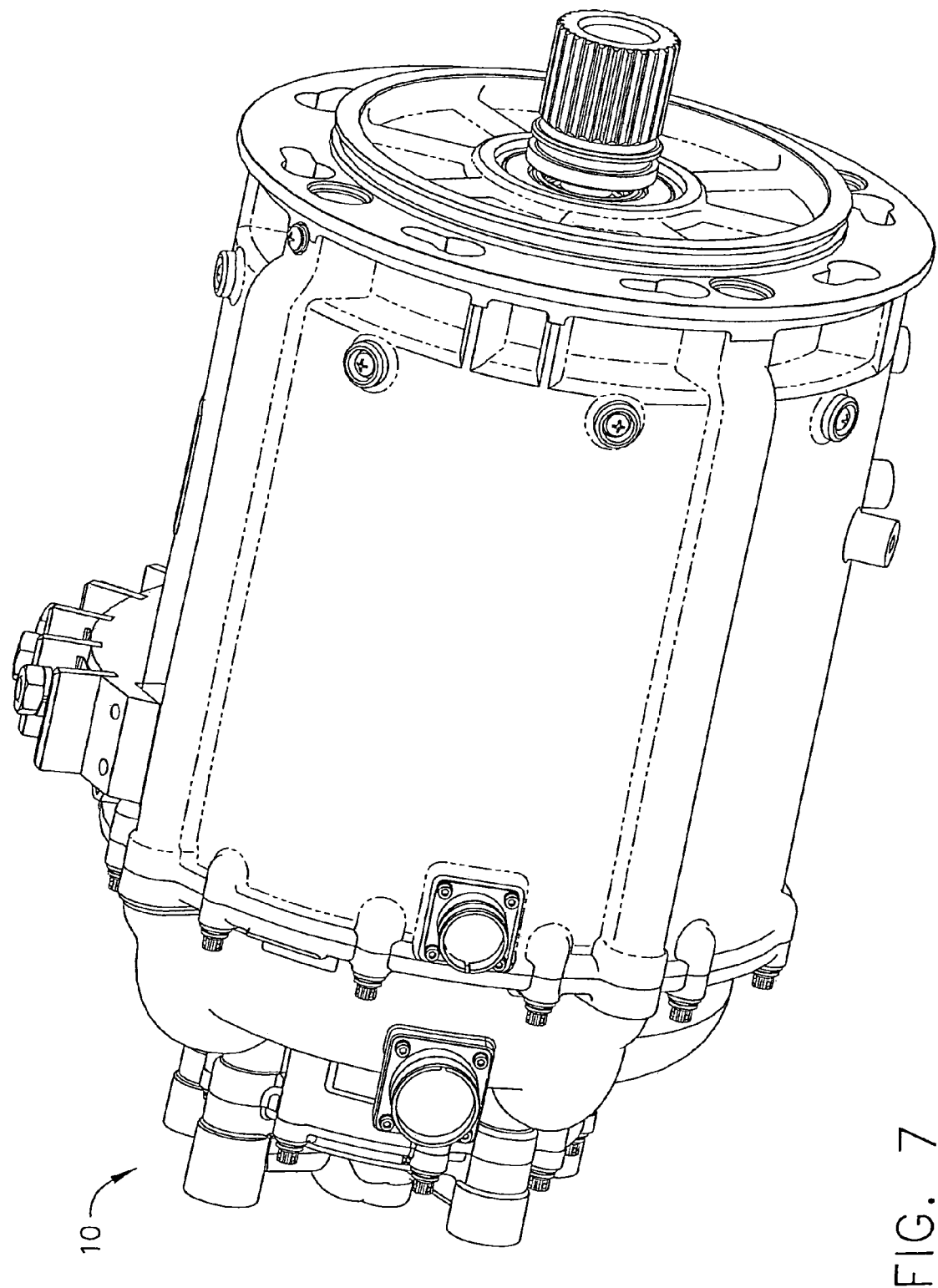
FIG. 7 is a perspective view of a generator in which the rotor assembly of FIG. 1 may be employed.

A support wedge is mounted in the area between each of the respective poles. The teachings of the present invention are not confined to any particular wedge configuration. The four pole rotor assembly 12 illustrated in FIGS. 1 and 2 includes four outer support wedges 24a–24d (24c and 24d not visible) and four inner support wedges 26a–26d (26c and 26d not visible) coupled by attachment screws 30 and jack screws 32. The support wedges 24a–24d and 26a–26d may be mounted in the rotor assembly 12 by the system described and claimed in co-pending application Ser. No. 09/948,866 or by other methods. The outer support wedges 24a–24d are also restrained on the rotor assembly 12 by the end caps 16a and 16b as hereinafter described. FIGS. 5 and 6 illustrate exemplary outer support wedges having end pieces 31 at a first and second end, an intermediate portion 33 with at least one axial channel 38 and a baffle 35 between each end piece 31 and the intermediate portion 33.

The first and second ends of each of the outer support wedges 24a–24d include, respectively, paired openings 34 (first end) and 134 (second end) arranged either along an outer edge (FIG. 5) or along the same radial line (FIG. 6). The first and second ends respectively, of the outer support wedges 24a–d of the first embodiment as shown in FIG. 5 also include at least one supply port 36 (first end) and 136 (second end) open to the at least one axial channel 38 in the intermediate portion 33. In the alternative outer support wedge configuration shown in FIG. 6, the cooling medium is supplied to the at least one axial channel through at least one of the paired openings 34 for flow of a cooling medium therethrough as hereinafter described. The cooling medium can be any lubricating or hydraulic fluid. A preferred cooling medium is oil since the cooling medium also serves to lubricate bearings in these same generators. Although no axial channels are shown within the inner support wedges, it is to be understood that in alternate embodiments these inner support wedges may also include at least one axial channel for circulating cooling medium.

Further referring to FIGS. 1 and 2, the rotor assembly 12 includes the end cap 16a over a first end of the rotor body and an end cap 16b over a second end of the rotor body. The first end of the rotor body is the anti-drive end, and the second end of the rotor body is the drive end. The end caps 16a and 16b, as shown more particularly in FIGS. 2, 3 and 4 comprise a substantially circular end wall 40 circumferentially surrounded by an annular flange 42. The annular flange 42 projects inwardly from the end wall 40 toward the opposite end cap. The end caps 16a and 16b shown in FIGS. 1–4 include four paired end cap openings 46 with each pair arranged at 90 degree angles to each other. In the first embodiment, the paired end cap openings are arranged circumferentially around the perimeter of the end wall 40 with a separate cooling medium feed port 47 between the openings in each pair. In an alternative embodiment, the paired end cap openings 46 may be arranged along the same radial line (not shown) with at least one of the openings in each pair serving as the cooling medium feed port as hereinafter described. The feed port is open to the inside of the end cap. Each of the end caps 16a and 16b include a bore 20 substantially in the center of the end wall 40.

The end caps 16a and 16b also include a manifold 21 for circulating the cooling medium through the rotor assembly 12. The manifold is at a hub location on the interior of each end cap 16a and 16b. The manifold illustrated in FIG. 3 includes an annulus 48 at an inner face of the bore 20 and four galleries 50a–50d (50c and 50d not visible) at 90° angles to each other that extend radially away from the annulus 48 toward the inner surface of the flange 42. The annulus substantially ensures cooling medium flow in the event of a cooling medium passage in the shaft becoming blocked and equalizes flow/pressure between the support wedges. The cooling medium galleries 50a–50d are capped by a plug 52a–52d at the outer surface of the flange 42. The number of cooling medium galleries 50a–50d in each end cap correspond to the number of poles 18a–d. The galleries 50a–50d extend to the feed port in the end caps to supply cooling medium to the at least one supply port 36 and 136 respectively in the first and second ends of each support wedge. A groove 53 may be cut in the axial face of the inside of the end cap around the feed port for receipt of a sealing member such as an O-ring or the like. The sealing member substantially prevents leakage under the high operating pressures of the generator 10. Alternatively, or in addition, the outer support wedges 24a–24d may include the groove 53 for the sealing member as shown in FIG. 5.

To assemble the rotor assembly 12 of FIG. 1, the end caps 16a and 16b are positioned on the respective ends of the rotor body with the bore 20 centered around the shaft 14 to substantially maintain rotor centerline control during generator operation. The annular flange 42 extends circumferentially around the axial ends of the rotor body including the axial ends of the support wedges 24a–24d to help restrain the wedges 24a–24d against the windings. After being machined then held on the rotor assembly with tooling to provide close tolerance fits, the ends of the outer support wedges 24a–24d are centered under the end cap flange 42. The paired end cap openings 46 are mated with the paired openings 34 and 134 in the first and second ends of each outer support wedge 24a–24d. Axial screws 54 are inserted into the paired openings 46 through the end caps 16a and 16b and into the corresponding paired openings 34 and 134. This arrangement provides structural support and stiffens the rotor 12 against flexure to help raise rotor 12 critical speeds. In the first embodiment, the separate cooling medium feed port in the end caps are mated with the at least one supply port in the first and second ends of the outer support wedges. In the alternative embodiment, at least one of the end cap openings in each pair serves as both the cooling medium feed port and receives the axial screws and at least one of the openings in each of the paired openings 34 and 134 of the outer support wedges serves as the supply port and receives the axial screws.

The bore 20 and the annular flange 42 are shrunk fit respectively around the shaft 14 and over the axial ends of the outer support wedges 24a–24d. The inner diameter of each end cap bore 20 is slightly smaller than the diameter of the shaft 14 to form the shrink fit of the end cap on the shaft 14. Thus, the end caps 16a and 16b are shrunk fit both between the shaft 14 at an end cap inner diameter and the outer support wedges 24a–24d at an end cap outer diameter. The end caps 16a and 16b seal the rotor ends and restrain the support wedges 24a–24d tightly against the windings thus further providing structural support to the rotor 12. The end cap outer diameter is designed to lean toward the support wedge ends as speed increases during rotation. This tightens the fit at the interface between the manifold and the supply ports in the support wedges and thus seals the interface.

As further shown in FIG. 1, the end caps 16a and 16b also include a raised peripheral edge 56 having a plurality of circumferentially spaced openings 58 provided therein. After the completely assembled rotor assembly is tested on a balance machine, weights (not shown) may be selectively inserted and secured into at least one of the plurality of circumferentially spaced openings 58 in order to balance the rotor assembly which helps control vibration of the rotor assembly 12 during generator operation.

When the end caps 16a and 16b are disposed over the first and second ends of the rotor body, the radial cooling medium galleries 50a–50d in the end caps 16a and 16b extend from the corresponding orifices 22a–22d and 122a–122d in the shaft 14 to the at least one supply port 36 and 136 in each of the outer support wedges 24a–24d.

As illustrated in FIG. 2, the cooling medium flows into the first end (the anti-drive end) of the shaft 14, exits the shaft 14 radially out the orifices 122a–122d at a second end (drive end) of the shaft 14, through the annulus 48 to the radial cooling medium galleries 50a–50d in the end cap 16b at the second end of the rotor body, into the at least one supply port 136 in the second end of the outer support wedges 24a–24d, through the axial channels 38 of the outer support wedges 24a–24d extracting heat, then out the at least one supply port 36 at the first end of the support wedges 24a–d, through the radial cooling medium galleries 50a–50d of the end cap 16a at the first end of the rotor body, out the annulus 48 of that end cap and into the orifices 22a–22d at the first end of the shaft 14 for exiting out the open first end of the shaft 14 and removing heat from the rotor assembly 12.

From the foregoing, it is to be appreciated that the rotor assembly 12 rotates at high speeds with the shaft 14 during the generation of power, subjecting the windings on each of the poles 18a–18d to significant centrifugal forces that are substantially counteracted by the end caps 16a and 16b. At speed, centrifugal force causes an even tighter connection between the end caps 16a and 16b and the support wedges.

The invention is not limited to use with a generator with a four-pole rotor. With a modification to the number of support wedges and the manifold, the invention can be practiced with generators having any number of poles on the rotor.

Although a particular embodiment of the invention has been described in detail for purposes of illustration, various modifications may be made without departing from the spirit and scope of the invention. Accordingly, the invention is not to be limited, except as by the appended claims.

We claim:

1. A method of assembling a balanced high speed generator rotor having a plurality of poles and at least one support wedge mounted between each of the poles comprising the steps of:

placing an end cap over each end of a rotor body;

centering a bore in each of the end caps around a shaft that extends axially through the rotor body;

centering at least one support wedge under the inside of each end cap;

aligning a plurality of paired openings in the end caps with a plurality of paired openings in each end of each of the at least one support wedge;

shrink fitting the end cap over each end of the rotor body by shrink fitting the bore around the shaft and the axial ends of the at least one support wedge under each end cap;

inserting an axial screw through each one of the openings of the plurality of paired openings in the end caps to be received in the aligned paired openings in each end of the at least one support wedge;

testing the rotor on a balance machine; and selectively inserting as required weight into at least one of a plurality of circumferentially spaced openings in the raised peripheral edge of each end cap to balance the rotor.

* * * * *